June 8, 1954
C. C. AVERILL
2,680,587
MATERIAL HANDLING PALLET
Filed Aug. 14, 1950
3 Sheets-Sheet 1
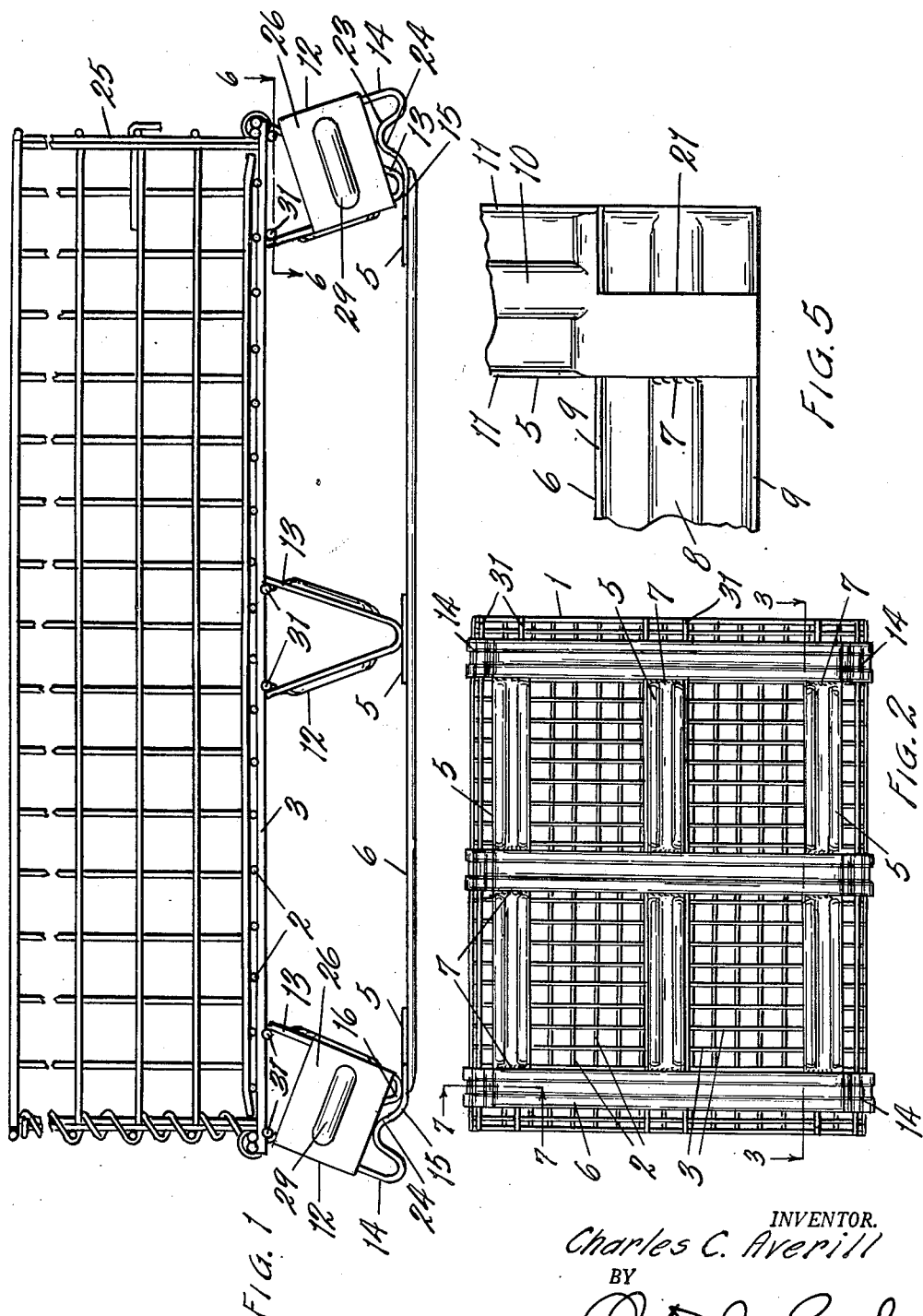
INVENTOR.
Charles C. Averill
BY
Otis A. Earl
Attorney.

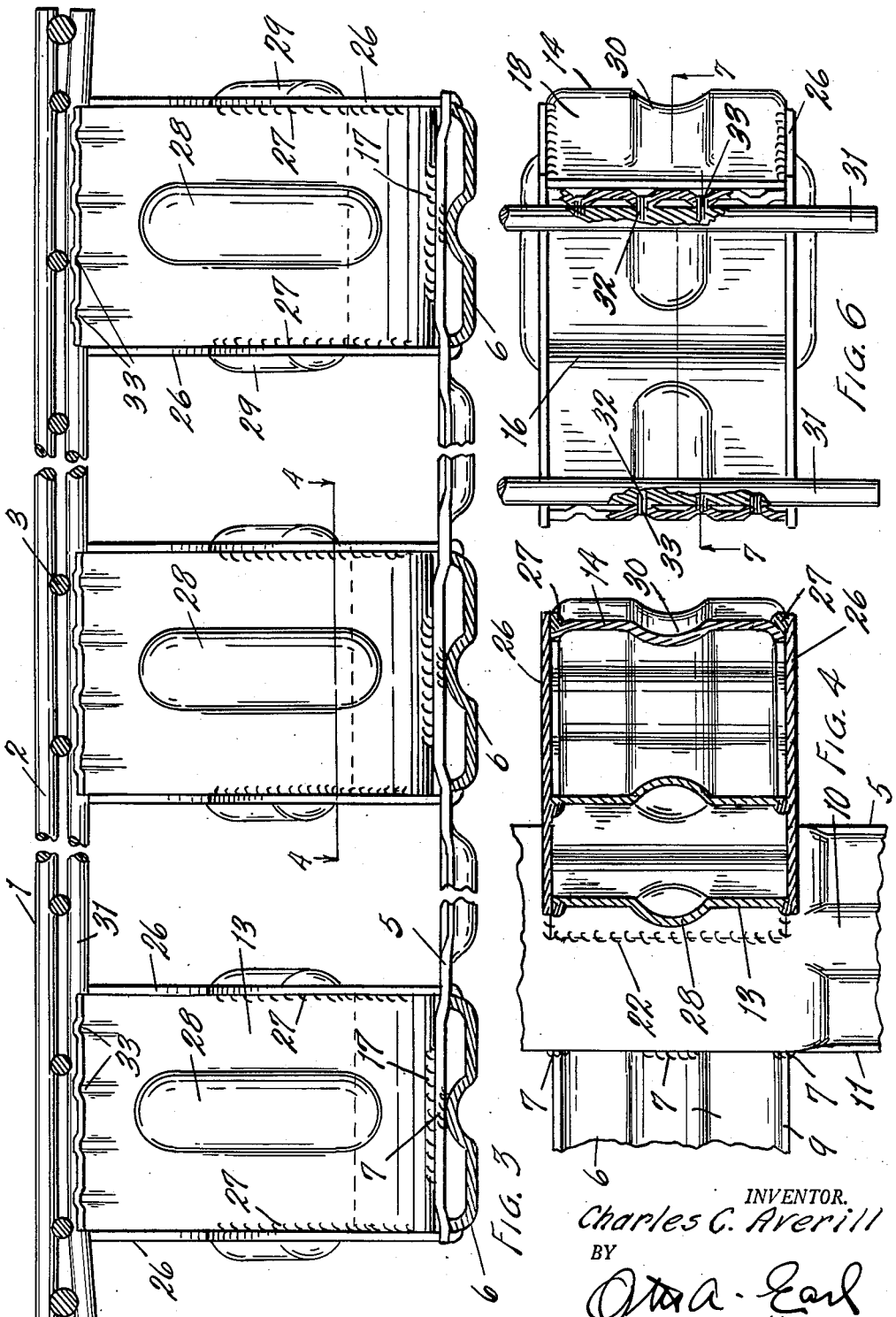

Patented June 8, 1954

2,680,587

UNITED STATES PATENT OFFICE 2,680,587

MATERIAL HANDLING PALLET

Charles C. Averill, Albion, Mich., assignor to Union Steel Products Company, Albion, Mich.

Application August 14, 1950, Serial No. 179,127

4 Claims. (Cl. 248—120)

This invention relates to improvements in material handling pallets.

The main objects of this invention are:

First, to provide a pallet which is adapted for stacking on similar pallets provided with walls.

Second, to provide a pallet with improved leg units capable of withstanding very severe stresses and shock such as being struck with the prongs of a lifting truck or being subjected to strains or stresses resulting from the prong of the lifting truck being thrust against the same to slidably position the pallet while loaded.

Third, to provide a pallet which is very strong and rigid even when made of relatively light stock.

Objects relating to details and economies of the invention will appear from the description to follow. The invention is pointed out in the claims.

A preferred embodiment of the invention is illustrated in the accompanying drawings, in which:

Fig. 1 is a fragmentary side elevational view of a pallet embodying my invention, the pallet being provided with side walls or a crate mounted on the deck thereof.

Fig. 2 is an inverted view.

Fig. 3 is an enlarged fragmentary view taken on a line corresponding to line 3—3 of Fig. 2 the walls being omitted.

Fig. 4 is an enlarged fragmentary view in section on a line corresponding to line 4—4 of Fig. 3.

Fig. 5 is a fragmentary view illustrating the details of the base members and their connections at the corners of the structure.

Fig. 6 is an enlarged fragmentary view partially in section on a line corresponding to line 6—6 of Figs. 1 and 7.

Figure 7:
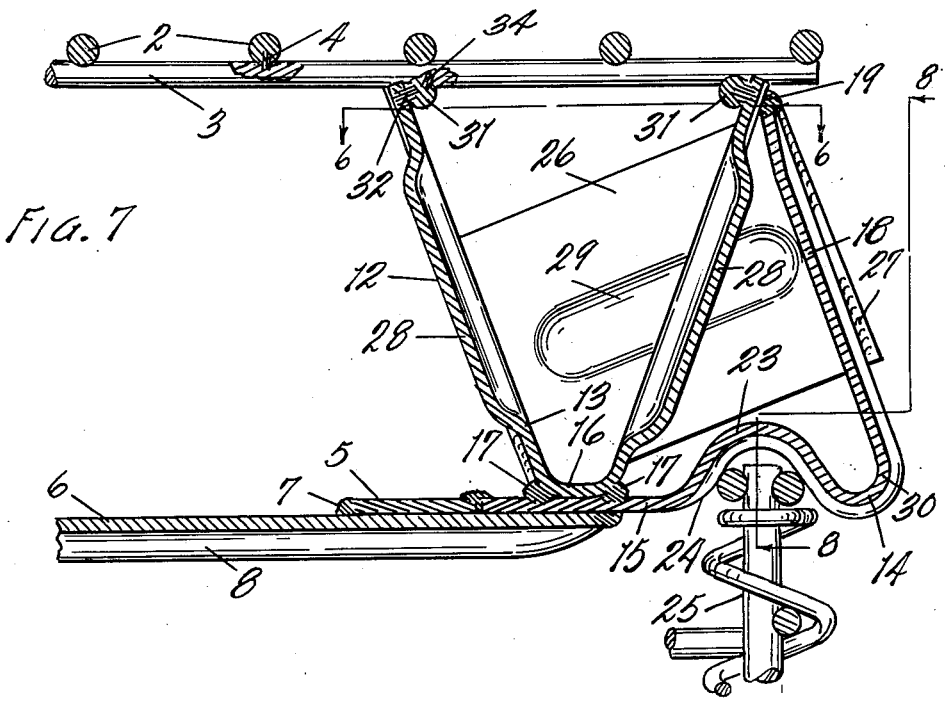
Fig. 7 is an enlarged fragmentary view on a line corresponding to line 7—7 of Figs. 2 and 8.
Figure 8:
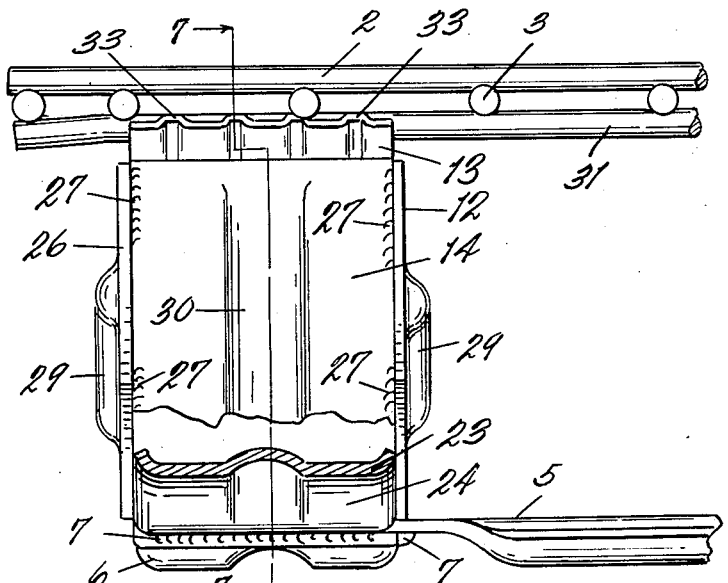
Fig. 8 is a fragmentary view partially in section on a line corresponding to the broken line 8—8 of Fig. 7.

In the embodiment of my invention illustrated the deck or top designated generally by the numeral 1 comprises an upper series of spaced parallel slats 2 and a lower series of spaced parallel slats 3. These are disposed in crossing relation and welded together at their crossing points as indicated at 4 in Fig. 7. The slats may be formed of heavy wire or light rods.

The base comprises an upper series of spaced parallel base bars 5 and a lower series of spaced parallel base bars 6, these being disposed in crossing relation and welded together at their crossing points as conventionally indicated at 7. The welds are desirably of the welding rod type. The base bars are formed of sheet metal disposed horizontally flatwise as is illustrated. The lower series of base bars have upwardly disposed longitudinal ribs 8 and upturned longitudinal edges 9 whereby they are materially stiffened. The upper series have longitudinal reinforcing ribs 10 and upturned reinforcing edges 11 in their reaches intermediate the lower series of base bars. This results in a very strong and rigid base even when formed of comparatively light sheet metal stock.

It will be noted that the edges of the deck project substantially beyond the base. The deck is supported on the base by means of leg units designated generally by the numeral 12 and comprising V-shaped main leg members 13 also formed of sheet metal stock and in the embodiment illustrated of a width corresponding to the width of the base bars. The auxiliary combined leg and stacking members 14 are likewise formed of sheet metal stock and desirably of a width of the stock of the main leg members 12. These auxiliary leg members are of angle shape and disposed with their angles facing inwardly and upwardly and with their horizontal arms 15 extending below the bights 16 of the leg members 12 and fixedly secured thereto as by the welds 17.

The vertical arms 18 of the members 14 are secured to the outer legs of the leg members 12 and fixedly secured thereto as by welds 19. The arms 15 of the auxiliary leg members are disposed upon the adjacent ends of the base members 6 and their inner ends are welded to the upper series of base members 5 as shown at 20, the upper base members being notched or recessed at 21 and 22 (see Figs. 4 and 5) to receive the ends of the arms 15. The arms 15 have upward offsets 23 formed therein beyond the base providing downwardly facing stacking recesses or pockets 24 adapted to engage the upper edges of opposed walls of the crate or receptacle 25.

The leg units are braced by means of the plate-like braces 26 which are arranged in an inwardly inclined relation on the side edges of the leg members 12 and the upwardly projecting arms of the auxiliary leg members 18 and fixedly secured thereto by welding as is indicated at 27. The legs of the leg members 12 are preferably stiffened by means of the ribs 28 struck up therein. The bracing plates 26 desirably have reinforcing ribs 29 therein while the auxiliary leg members are provided with reinforcing ribs 30 which extend onto both arms thereof and into the portions constituting the stacking recesses. This provides a very rigid leg unit even when its parts are formed of relatively light stock.

The aligned legs of the leg members are connected to each other and connected to the deck by means of the rods 31 which are welded to the inner sides of the legs as indicated at 32, the legs having bosses 33 therein facilitating the making of the electric welds. It will be noted that there are several of these welds for each leg. The rods 31 are disposed crosswise relative to the lower series of deck slats and welded thereto at their crossing points as indicated at 34.

The legs of a pallet of this type are subjected to very severe usage as it is not merely a matter of sustaining the load but they are frequently struck by the prongs or forks of a lifting truck both in positioning to pick up and in withdrawing the forks from the pallet and also it is rather common practice for the operator to bunt the forks against the legs in order to position the pallet. I have illustrated my invention as having leg units designed for stacking on walled trucks but they are highly desirable and practical on pallets in which the decks are not provided with walls.

I have illustrated and described my invention in one highly practical embodiment thereof. I have not attempted to illustrate or describe other embodiments or adaptations as it is believed that this disclosure will enable those skilled in the art to embody or adapt my invention as may be desired.

Having thus described my invention, what I claim as new and desire to secure by Letters Patent is:

1. In a materials handling pallet, the combination of a deck, a base comprising upper and lower series of spaced sheet metal members of substantial width disposed horizontally flatwise in crossing relation and fixedly connected at their crossing points, and leg units comprising sheet metal leg members having upwardly projecting legs integrally connected at the lower ends thereof, and angled sheet metal auxiliary leg members disposed with the arms of their angles facing inwardly and upwardly and providing horizontal arms and upright arms with their horizontal arms secured to the lower ends of the leg members and fixedly connected to the adjacent base bars of both series with portions of the horizontal arms disposed in lapping horizontally flatwise relation to horizontally flatwise portions of certain base bars of one series and in edge abutting relation to certain base bars of the other series, the upright arms of the auxiliary members being secured to the adjacent legs of the leg units, said auxiliary leg members having downwardly facing stacking recesses therein disposed outwardly relative to the adjacent base bars.

2. In a materials handling pallet, the combination of a deck, a base comprising upper and lower series of spaced sheet metal members of substantial width disposed horizontally flatwise in crossing relation and fixedly connected at their crossing points, and leg units comprising sheet metal leg members having upwardly projecting legs integrally connected at the lower ends thereof, and angled sheet metal auxiliary leg members disposed with the arms of their angles facing inwardly and upwardly and providing horizontal arms and upright arms with their horizontal arms secured to the lower ends of the leg members and fixedly connected to the adjacent base bars of both series with portions of the horizontal arms disposed in lapping horizontally flatwise relation to horizontally flatwise portions of certain base bars of one series and in edge abutting relation to certain base bars of the other series, the upright arms of the auxiliary members being secured to the adjacent legs of the leg units.

3. A leg unit for a material handling pallet comprising an upwardly facing V-shaped sheet metal main leg member adapted for attachment to a pallet deck, an angled sheet metal combined auxiliary leg and stacking member disposed with the arms of its angle facing inwardly and upwardly and with one arm horizontal and disposed under the bight of the main leg member and fixedly secured thereto, the other arm of said auxiliary member being inwardly inclined and fixedly secured to the adjacent leg of the main leg member adjacent the top thereof, the horizontal arm of said auxiliary leg member having an upward offset in the portion thereof disposed outwardly of the main leg member, and pairs of plate-like brace members fixedly secured to the side edges of the main and auxiliary leg members.

4. A leg unit for a material handling pallet comprising an upwardly facing V-shaped sheet metal main leg member adapted for attachment to a pallet deck, an angled sheet metal combined auxiliary leg and stacking member disposed with the arms of its angle facing inwardly and upwardly and with one arm horizontal and disposed under the bight of the main leg member and fixedly secured thereto, the other arm of said auxiliary member being inwardly inclined and fixedly secured to the adjacent leg of the main leg member adjacent the top thereof, the horizontal arm of said auxiliary leg member having an upward offset in the portion thereof disposed outwardly of the main leg member, and a bracing member extending between and fixedly secured to the main and auxiliary leg members.

References Cited in the file of this patent

UNITED STATES PATENTS

| Number | Name | Date |
| --- | --- | --- |
| 1,605,901 | O'Neil | Nov. 2, 1926 |
| 2,175,326 | Thompson | Oct. 10, 1939 |
| 2,452,356 | Coit | Oct. 26, 1948 |
| 2,463,588 | Arthur | Mar. 8, 1949 |
| 2,471,095 | Coit | May 24, 1949 |
| 2,546,830 | McKim | Mar. 27, 1951 |
| 2,576,672 | Coit | Nov. 27, 1951 |